United States Patent [19]

Meyers

[11] Patent Number: 5,092,661
[45] Date of Patent: Mar. 3, 1992

[54] TIRE LATERAL SUPPORT

[76] Inventor: Walter A. Meyers, P.O. Box 135, Poway, Calif. 92064

[21] Appl. No.: 400,073

[22] Filed: Aug. 28, 1989

Related U.S. Application Data

[63] Continuation-in-part of Ser. No. 90,259, Aug. 27, 1987, abandoned.

[51] Int. Cl.$^5$ .............................................. B60B 7/02
[52] U.S. Cl. .............................. 301/37 ST; 301/38 R
[58] Field of Search .............. 152/375, 385, 516, 520, 152/539; 301/38 R, 37 ST, 39 T

[56] References Cited

U.S. PATENT DOCUMENTS

| | | | |
|---|---|---|---|
| 1,321,992 | 7/1919 | Disselkoen | 301/37 ST |
| 1,387,797 | 8/1921 | Miller | 301/39 T |
| 1,435,086 | 11/1922 | Shannon | 301/39 T |
| 1,885,901 | 11/1932 | Ennis | 152/375 X |
| 2,019,120 | 10/1935 | Cunningham et al. | 301/39 T |
| 2,209,967 | 7/1937 | Golod | 301/37 ST |
| 2,347,622 | 7/1942 | Tschanz | 301/38 R |
| 2,691,550 | 4/1951 | Nickerson | 301/37 ST |
| 2,915,335 | 5/1956 | Barnes | 301/37 ST |
| 3,515,436 | 6/1970 | Giacobbe | 301/38 R |
| 4,308,907 | 1/1982 | Monzini | 152/398 X |

FOREIGN PATENT DOCUMENTS

| | | | |
|---|---|---|---|
| 18205 | 10/1956 | Fed. Rep. of Germany | 152/375 |
| 2005428 | 8/1971 | Fed. Rep. of Germany | 301/38 X |
| 255230 | 10/1927 | Italy | 301/39 T |
| 316064 | 9/1956 | Switzerland | 301/39 T |
| 401345 | 11/1933 | United Kingdom | 301/37 ST |

Primary Examiner—Johnny D. Cherry
Assistant Examiner—Gary C. Hoge
Attorney, Agent, or Firm—Thomas J. Tighe

[57] ABSTRACT

A rim bead flange of a ground surface vehicle, pneumatic tire wheel is effectively, and in one embodiment actually, extended radially outward to an extent whereby the extension covers ⅛ to ⅓ of the area of the adjacent sidewall of the tire in order to provide lateral support against sheer deformation for said sidewall. The extension is accomplished by retrofittable ring plates or by an integral extension of the rim bead flange.

7 Claims, 3 Drawing Sheets

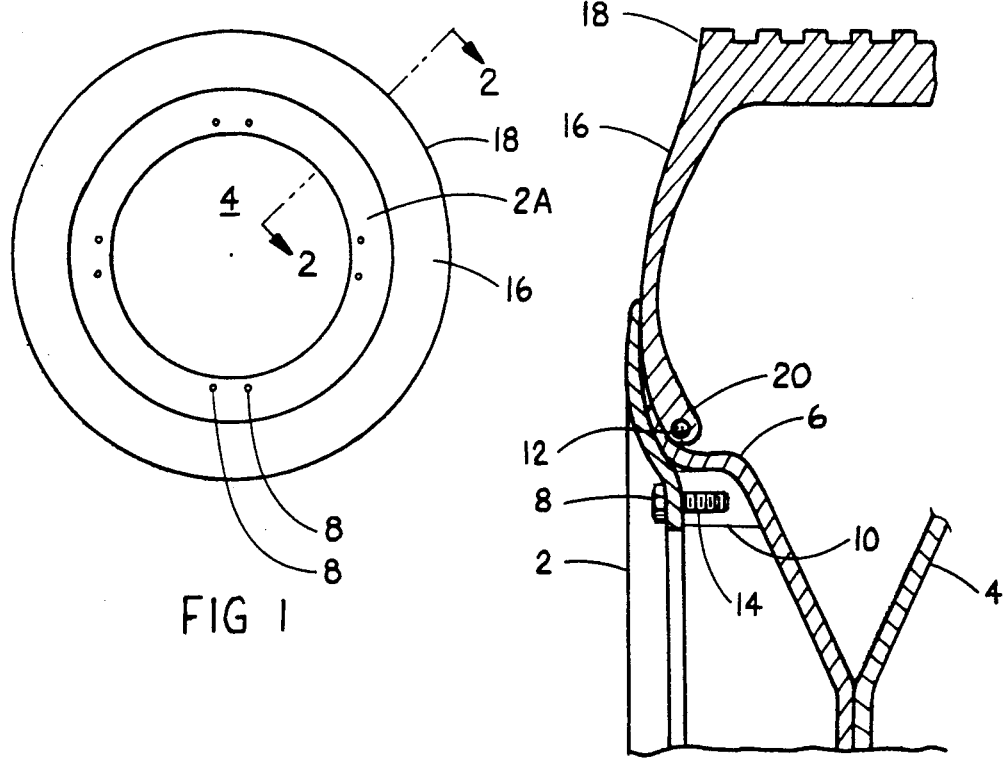
FIG 1
FIG. 2
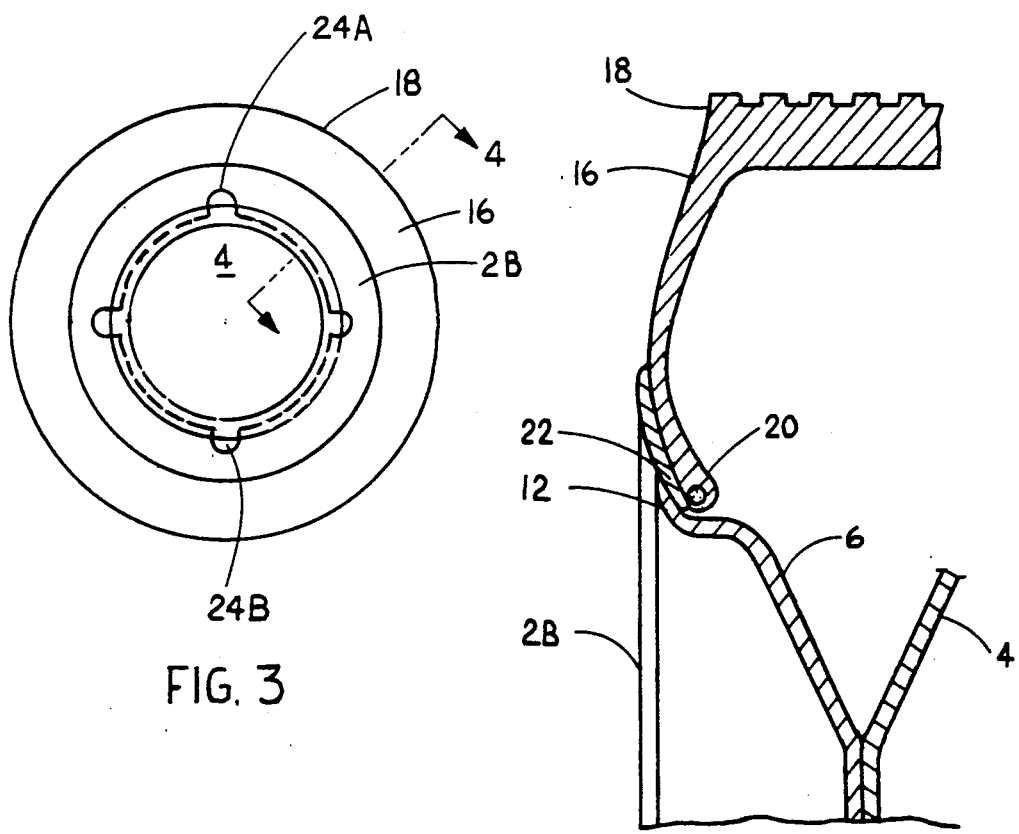
FIG. 3
FIG. 4

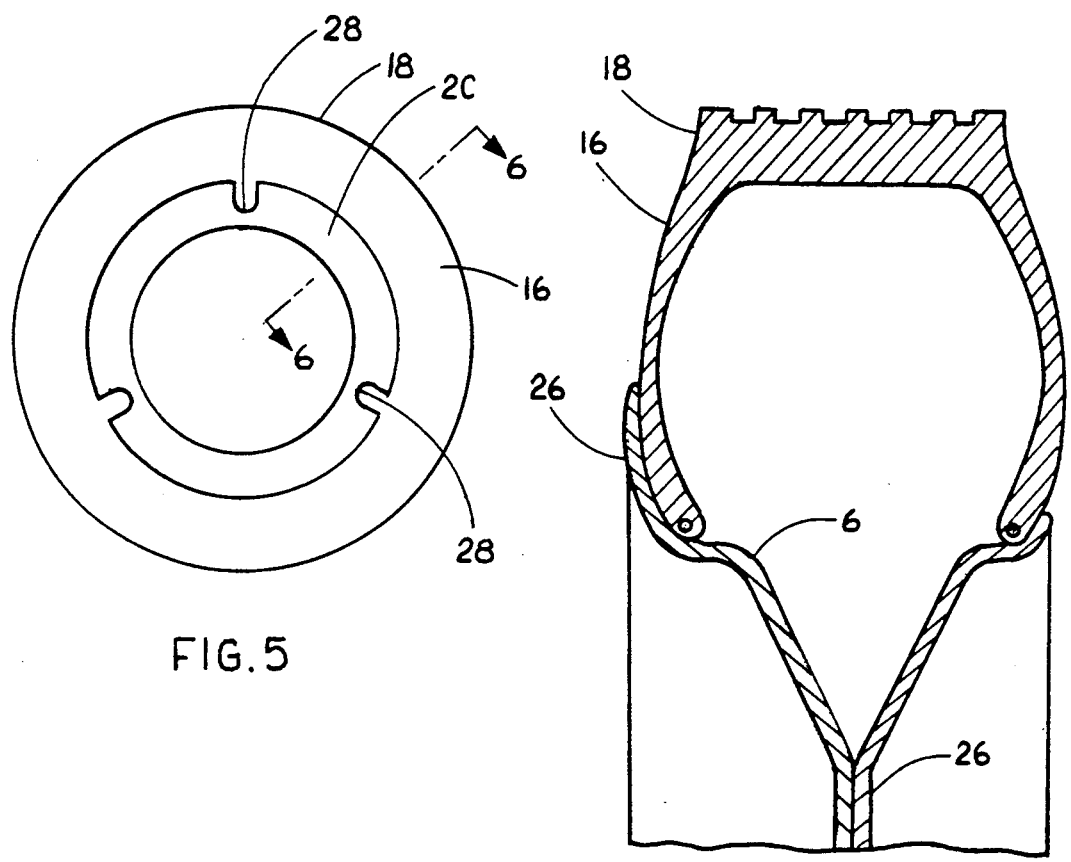
FIG. 5
FIG. 6
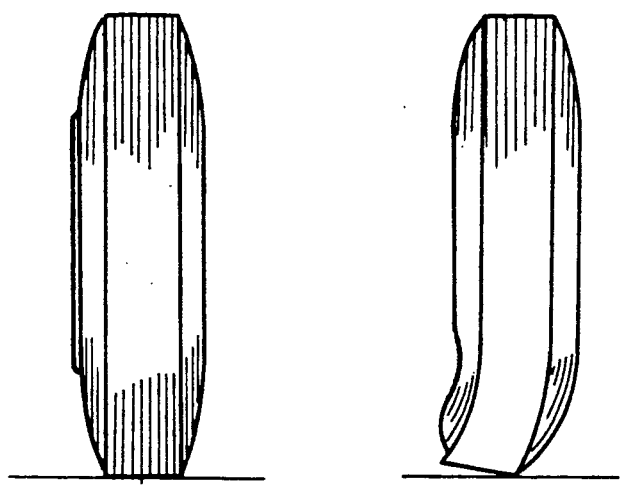
FIG. 7
FIG. 8

TIRE LATERAL SUPPORT

This is a continuation-in-part of application Ser. No. 07/090,259, filed Aug. 27, 1987 now abandoned.

BACKGROUND OF THE INVENTION

This invention relates in general to means affixed to the rims of wheels of ground surface vehicles for support of the sidewalls of pneumatic tires on said wheels and in particular to those means which provide lateral support against sheer deformation of the tires.

It has long been known that pneumatic tires mounted on the wheels of a ground surface vehicle deform laterally when the vehicle is turning. During a turn the inertia of the vehicle urges the vehicle to continue in a straight line, but the friction between the turned front wheels and the surface upon which the vehicle is travelling creates a path of least resistance in the direction of the turn. The friction acts as a sheering force on the tread of the tires in contact with the ground surface, especially the front tires, causing the tires to deform laterally (sheer deformation) toward the center of the turn. The magnitude of the sheering force or friction on any given tire is, at least in part, a function of the weight being carried by that tire. The tires on the outside of the turn are therefore subjected to greater sheer forces than the inside tires because the centrifugal force acting on the vehicle during the turn tends to shift the weight of the vehicle to the outside tires.

During low and moderate speed turns, such as turns made in the normal course of everyday driving, the deformation of the tires is not a problem because the sidewalls of typical tires are stiff enough to keep the degree of deformation within safe limits. However, during high speed turns, such as those made during a vehicle race, the deformation becomes a serious problem. If the degree of deformation becomes too large it can fold the tire toward the center of the turn and significantly reduce the tread area in contact with the surface. Such a reduction can cause the tires to break into a slide and thereby reduce operator control of the vehicle. Furthermore, the deformation significantly reduces the useful life of the tires by causing increased wear and tear on them.

This invention presents a retrofittable device which adds lateral support to such tires, especially to the inboard sides of the tires, in order to make them effectively laterally stiffer and more resistant to the above-described sheer deformation.

U.S. Pat. No. 412,699 shows the use of sidewall wheel flanges to laterally confine and crimp a solid rubber tire to a wheel. U.S Pat. No. 772,818 presents another tire with a high walled rim to confine and in one case to crimp the tire onto the wheel rim. U.S. Pat. No. 1,113,356 presents side plates to provide support under vertical load. All of these patents are for wheels and rims which did not involve pneumatic tires and they are either for the purpose of confining the tires to the rims and/or for vertical support. They are also adapted to tires which are very different from the type of tires commonly in use today.

U.S. Pat. No. 1,885,901 presents a tubed tire in a wheel which has annular wall plates or disk members bolted to the brake drums of the wheel by strengthening disks. These plates or disk members actually form the bead area.

U.S. Pat. No. 2,426,628 shows another wheel with relatively high rim walls which provide vertical support for a mechanism which comes into play when the tire becomes deflates as in a punctured tire. In this patent and the others described above the rim flanges are designed to accommodate the type of tires which were in use when those inventions were patented. They were apparently needed to provide vertical support for the sidewalls to offset the deforming of the side walls due to vertical loads. None of the patents disclose lateral support necessary to prevent sheer induced deformation of the tires under high speed turns.

U.S. Pat. No. 4,427,046 presents a pneumatic tire with an integral stiffening member in the bead and lower sidewall area.

U.S. Pat. No. 4,253,511 presents a specialized rim which has horizontal bracing flanges which are actually stop means for vertical columns which are an integral part of the sidewalls of the tires. When the tires are deflated or underinflated, the load on the tire deforms it up to a point where the sidewall columns abut the rim flanges. This has the effect of minimizing the deformation.

U.S. Pat. No. 4,287,924 presents a tire with self-supporting sidewalls for uninflated situations.

U.S. Pat. No. 4,168,732 presents rims with bolted-on annular rings. The rings are to prevent excessive deformation of the tire by overload conditions. This patent and the last two require specialized, unconventional tires adapted to a specialized rim. Also, they are not intended to prevent sheer induced deformation of the tire under dynamic conditions.

Other advantages and attributes of this invention will be discussed or will be readily apparent upon a reading of the text hereinafter.

SUMMARY OF THE INVENTION

An improvement to the wheels of ground surface vehicles which are adapted to have pneumatic tires mounted thereon comprising a ring plate which effectively extends a rim bead flange of a wheel, preferably on the inboard side of the wheel, such that the extension covers from $\frac{1}{8}$ to $\frac{1}{3}$ of the area of the sidewall of the tire. The ring plate can be retrofitted onto conventional wheels or it can be an integral part of the wheel, the extension providing lateral support for the sidewall of the tire.

An object of this invention is to provide a means whereby the inboard side of pneumatic tires mounted on wheels of ground surface vehicles are provided with lateral support against sheer deformation.

Another object of this invention is to provide a means for retrofitting a device which laterally supports the inboard side of pneumatic tires mounted on the wheels of ground surface vehicles against sheer deformation.

Further objects of this invention will be readily discernible by the reading of the text hereinafter.

BRIEF DESCRIPTION OF THE DRAWINGS

FIG. 1 is a side elevational view of a first embodiment of this invention;

FIG. 2 is a partial sectional view of the embodiment of FIG. 1;

FIG. 3 is a side elevational view of a second embodiment of this invention;

FIG. 4 is a partial sectional view of the embodiment of FIG. 3;

FIG. 5 is a side elevational view of a third embodiment of this invention;

FIG. 6 is a partial sectional view of the embodiment of FIG. 5;

FIG. 7 is a pictorial representation of the lateral deformation of a conventional pneumatic tire mounted on a wheel adapted according to this invention during a high speed turn; and FIG. 8 is a pictorial representation of the lateral deformation of a conventional pneumatic tire mounted on a conventional wheel during a high speed turn.

DESCRIPTION OF THE PREFERRED EMBODIMENT

Figure 9:
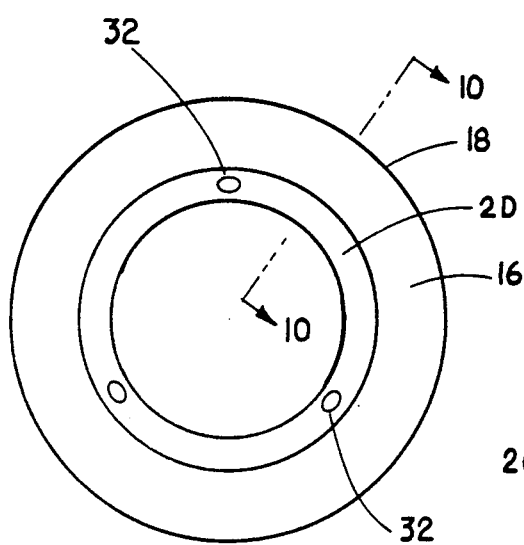
FIG. 9 is a side elevational view of a fourth embodiment of this invention.

Referring to FIGS. 1 and 2, a first embodiment of this invention is shown to have a ring plate 2A affixed to a side of a wheel 4 and annular to a rim 6 of the wheel by means of a plurality of bolt means 8 engaged with a plurality of mounting brackets 10 which are affixed to the wheel. The mounting brackets 10 of this embodiment are shown to be in the form of blocks uniformly circumferentially spaced on the underside of the rim 6 proximate a rim bead flange 12 and affixed thereto by welding, each block defining a pair of threaded bolt holes 14 which are adapted to engage bolts 8 which extend through corresponding holes defined by the ring plate 2A along its inner margin. The blocks 10 are affixed preferably by welding. The ring plate 2A has an annular width sufficient for it to cover ⅛ to ⅝ of the area of a sidewall 16 of a tire 18, the area covered being from the tire bead 20 and radially outward therefrom, and it is adapted to generally conform to the tire when the tire is inflated to normal pressure and under normal load conditions.

Referring to FIGS. 3 and 4, a second embodiment is shown to have a ring plate 2B with an inner margin 22 which is adapted to be interposed between the rim bead flange 12 and the bead portion 20 of a tire 18. When the tire is inflated, the ring plate margin 22 is clamped between the rim bead flange and the bead area of the tire, and thereby held in place. The ring plate 2B has an annular width sufficient for it to cover ⅛ to ⅝ of the area of a sidewall 16 of a tire 18, the area, covered being from the tire bead 20 and radially outward therefrom, and it is adapted to generally conform to the tire when the tire is inflated to normal pressure and under normal load conditions. At least one pair of notches 24A and 24B defined by the inner margin 22 of the plate 2B are oppositely disposed in order for the plate to be mounted on and dismounted from the wheel rim, the notches being adapted to slip the plate over the rim bead flange for installation and removal.

Referring to FIGS. 5 and 6, a third embodiment is shown to have an annular wall 2C which is an integral part of a wheel 26 and is an extension of the rim bead flange 12 of the wheels 4 shown in FIGS. 2 and 4. The annular wall 2C has an annular width sufficient for it to cover ⅛ to ⅝ of the area of a sidewall 16 of a tire 18, the area covered being from the tire bead 20 and radially outward therefrom, and it is adapted to generally conform to the tire when the tire is inflated to normal pressure and under normal load conditions. The wall 2C defines a plurality of notches 28 open to the outer margin of the plate. The notches are deep enough to allow a tire removal tool, such as a pry bar, to break an adhesive seal at the bead area of a tire (typically applied to maintain tire pressure) in order for the tire to be removed.

Figure 10:
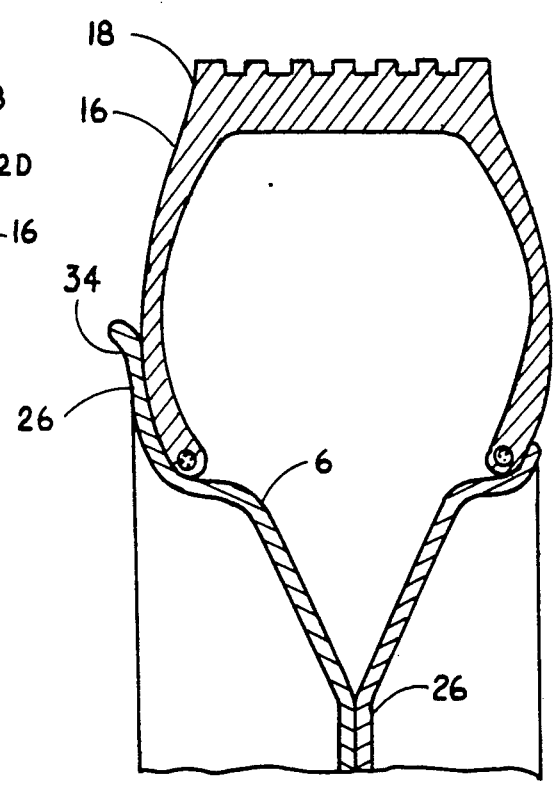
FIG. 10 is a partial sectional view of the embodiment of FIG. 9.

Referring to FIGS. 9 and 10, a fourth embodiment is illustrated as having an annular wall 2D which is an integral part of a wheel 30 and is an extension of the rim bead flange 12 of the wheels 4 shown in FIGS. 2 and 4. Preferably, the wall 2D has an annular width sufficient for it to extend one to one and a half inches from the tire bead and radially outward therefrom, and the wall has a curvature outwardly convex which generally conforms to and substantially abuts the tire when the tire is inflated to normal pressure and under normal load conditions, e.g., not being subjected to lateral sheet forces such as illustrated in FIG. 8. The wall 2D defines a plurality of slots 32 in the wall. The slots serve the same purpose as the notches of FIG. 5, i.e., they are large enough and are disposed to enable a tire removal tool, such as a pry bar, to break an adhesive seal at the bead area of a tire (typically applied to maintain tire pressure) in order for the tire to be removed. Although the illustration shows only three such slots, it should be understood that the number can vary depending on, among other things, the characteristics of the bead. It has been found that three such slots are the workable minimum. The slots have an advantage over the notches of FIG. 5 in that the outer margin of the wall is continuous and easier on a tire when it is heeling over in a turn. The outer wall margin also forms an outward radius 34 for the same purpose. Preferably the radius is one-half inches.

Referring to FIGS. 7 and 8, the effects of lateral sheer on a tire can be seen. The wheel without the adaptations of this invention (FIG. 8) on a vehicle undergoing a high speed turn is significantly deformed inwardly toward the center of the turn, thereby causing a reduction in traction and increased wear on the tire. The tire mounted on a wheel adapted according to this invention does not so deform and better traction is maintained. Also wear on the tire is reduced.

As explained, it is preferable for the ring plates and annular wall of this invention to be mounted on the inboard sides of the wheels because that is where they are most effective.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. In a surface vehicle wheel with a rim upon which a conventional pneumatic tire is annularly mounted, an improvement for reducing lateral sheer deformation of the tire comprising:

(a) a rigid ring plate connected to the inboard side of the wheel and annular to the rim, the ring plate substantially abutting an inboard side wall of the tire continuously around the tire and extending from a tire bead radially outward therefrom, and (b) a plurality of circumferentially spaced openings defined by said ring plate sufficiently sized and disposed to allow an external tire removal means to extend therethrough and gain access to the tire in order to break an adhesive seal between the tire bead and a rim bead flange on the inboard side.

2. The improvement according to claim 1 wherein the openings comprises notches.

3. The improvement according to claim 1 wherein the rigid ring plate comprises an integral radial extension of an inboard rim bead flange of the wheel, the extension covering an area of an adjacent inboard side wall of the tire from the inboard tire bead and extending radially outward therefrom.

4. The improvement according to claim 3 wherein the openings comprise slots.

5. The improvement according to claim 3 wherein the openings comprise notches.

6. The improvement according to claim 1 wherein the openings comprise slots.

7. The improvement according to claim 1 further comprising a radius formed by the outer margin of the ring plate.

* * * * *